United States Patent Office 3,008,262
Patented Nov. 14, 1961

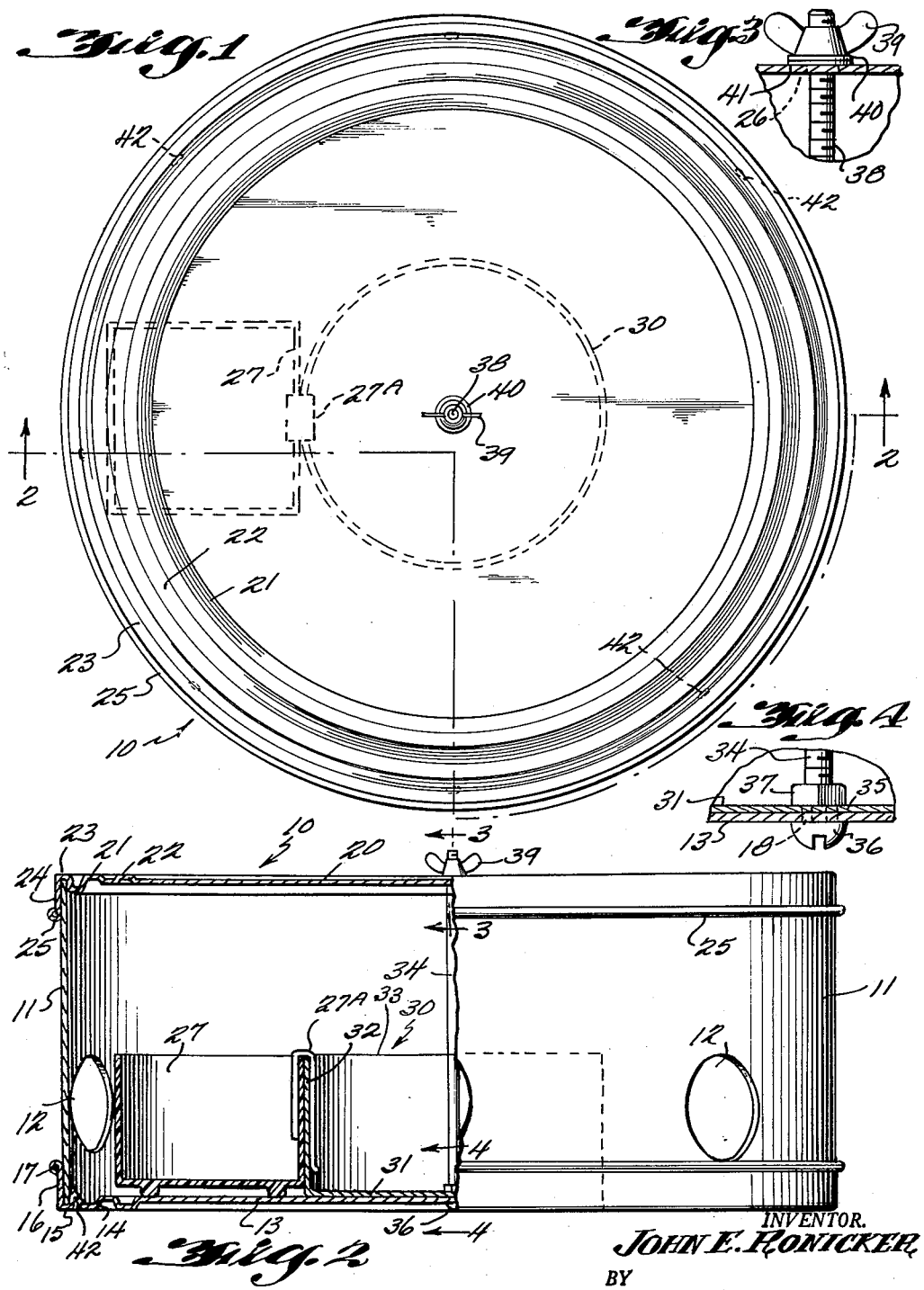

3,008,262
RAT BAIT STATION
John E. Ronicker, R.F.D. 1, West Milton, Ohio
Filed Feb. 8, 1960, Ser. No. 7,289
1 Claim. (Cl. 43—131)

This invention relates to a rat bait station, and has as its primary object the provision of an improved rat bait station or container for the positioning of rat bait of poison character, which incorporates a relatively high degree of safety in the provision of means whereby it is substantially impossible for an inquisitive child, or a household pet, such as a dog or a kitten, or livestock such as chickens, to obtain access to the bait.

An additional object of the invention is the provision of such a rat bait station which will be attractive to the rodents, and which will eliminate rat shyness in regards to the bait station.

A further object of the invention is the provision of such a rat bait station which is provided with a cover and with a protective bottom, so that it may be positioned out of doors, and will thus function as an all weather device.

A further object of the invention is the provision of a rat bait station of this character which is of relatively large dimensions, and which is provided with a plurality of ingress openings spaced sufficiently apart so that a number of rats may congregate at the poisoned bait at the same time without overcrowding, thus panicking the rats, and causing them to leave without consuming a portion of the poisoned bait.

A further and most important object of the invention is the provision of a rat bait station which comprises an outer receptacle or container, having openings or inlets for the rats, positioned relatively closely to the floor level, and provided with a central receptacle, which is relatively high, the arrangement being such that the central receptacle is far enough from the opening so that a small animal, such as a puppy or kitten, cannot reach the bait receptacle merely by putting its head through the opening, and similarly that even though a small child might be able to insert a hand through one of the inlet openings, it could not at the same time reach into the bait receptacle itself, and then twist the hand in such a manner as to remove any of the poisoned bait from the interior of the receptacle, this arrangement being occasioned by the fact that the top of the central bait receptacle is above or at least in alignment with the tops of he inlet openings.

Still another object of the invention is the provision of a rat bait station of this character wherein the parts are fastened securely together in such manner that the removal of the cover is normally beyond the strength of a small child so that access to the poisoned bait may not be had by a removal of the lid.

Still another object of the invention is the provision of a device of this character which is sturdy and durable in construction, reliable and efficient in operation, attractive to rodents, and relatively simple and inexpensive to manufacture and assemble.

Still other objects reside in the combinations of elements, arrangements of parts, and features of construction, all as will be more fully pointed out hereinafter and disclosed in the accompanying drawing wherein:

FIGURE 1 is a top plan view of one form of rat bait station constructed in accordance with the instant inventive concept;

FIGURE 2 is a view partially in section and partially in elevation, the section being taken substantially along the line 2—2 of FIGURE 1, as viewed in the direction indicated by the arrows;

FIGURE 3 is an enlarged sectional view taken substantially along the line 3—3 of FIGURE 2, as viewed in the direction indicated by the arrows; and FIGURE 4 is an enlarged fragmentary sectional view taken substantially along the line 4—4 of FIGURE 2, as viewed in the direction indicated by the arrows.

Similar reference characters refer to similar parts throughout the several views of the drawing.

Having reference now to the drawing in detail, the rat bait station of the instant invention is generally indicated at 10, and comprises an annular side wall 11, which is provided at spaced intervals about the lower portion thereof with a series of circular openings 12, so dimensioned as to admit a rat comfortably into the interior of the device. The apparatus is preferably painted a dull brown or other similar color so as to provide a dark background, it having been found that rats' shyness is occasioned when the rodents find themselves in front of a bright background, and silhouette.

A bottom 13 is provided, which includes an annular channel 14 adjacent its periphery and a second groove or recess 15 which engages about the bottom of side wall 11. An outer flange 16 extends upwardly a short distance along the exterior of the side wall 11, and is provided at its upper end with a bead 17, to facilitate removal of the bottom of the device when desired. A central opening is provided as at 18, for a purpose to be more fully described hereinafter.

The bait station or receptacle 10 is also provided with a cover or lid 20, which is similar in general configuration to the bottom 13, and which includes a pair of reinforcing ribs 21 and 22 adjacent its rim, and an annular groove 23, which seats upon the upper edge of the side wall 11. A depending flange 24 provided with a bead 25 extends downwardly a short distance from the top of the wall 11, the bead facilitating removal of the lid when desired. Lid 20 is also provided with a central opening 26 in alignment with the opening 18 in the bottom 13.

A central bait receptacle is provided, and is generally indicated at 30. Receptacle 30 includes a bottom wall 31 and an annular side wall 32. The height of the side wall is such that its top 33 is positioned at or slightly above the level of the uppermost top portion of the openings 12. This is of material importance, in that it precludes straight line ingress to the bait receptacle from the openings 12 and prevents a child inserting its hand into the receptacle and withdrawing poison therefrom. A rat, however, upon entering through one of the openings 12 may very easily, by standing on its hind legs, either enter the bait receptacle 30 or remove poisoned bait therefrom.

A water cup 27 of any suitable size and configuration is also positioned interiorly of the station and has secured thereto a spring clip 27A by means of which it may be secured to bait receptacle 30. The cup is thus prevented from spilling, but may be readily removed for cleaning or filling. The water cup is also of a height in excess of that of the openings 12 so that if placed adjacent an opening 12 it will close that opening to chickens or small pets so that, in the event the water is accidentally or designedly contaminated, the contents will neither be readily susceptible to spillage or accessible to pets, chickens or small children.

Drainage holes 42 are provided at suitable spaced intervals around bottom channel 14 to permit the drainage of rain water or snow blown into the station through openings 12.

The receptacle 30 is positioned centrally of the station, and is secured in position therein by means of a bolt 34, which extends completely through the device. The bolt 34 extends through a suitable opening 35 in the bottom 31 of the bait receptacle, and through the opening 18. A head is provided, as at 36, on the under or outer side of bottom 13, and a nut 37 clampingly secures bait-receptacle 30 in central position. The upper end of bolt 34 extends outwardly through the opening 26 in lid 20, and is suitably threaded, as indicated at 38, for the reception of a wing nut 39. A suitable metal washer 40 is positioned beneath the wing nut 39, while a rubber washer 41 is positioned beneath the washer 40 against the top of lid 20. The arrangement is thus such that the lid may be readily removed for the replenishment of poisoned bait in receptacle 30, but when the wing nut 39 is forcefully tightened, the friction of the washers 40 and 41 will serve to hold the lid 20 tightly in position, and preclude the removal of the wing nut and subsequent removal of the lid, by the relatively weak fingers of a child.

From the foregoing, it will now be seen that there is herein provided an improved rat bait station which accomplishes all the objects of this invention, and others, including many advantages of great practical utility and commercial importance.

As many embodiments may be made of this inventive concept, and as many modifications may be made of the embodiment herein shown and described, it is to be understood that all matter herein is to be interpreted merely as illustrative, and not in a limiting sense.

I claim:

In a rat bait station, the combination of an outer receptacle comprised of an annular side wall, a removable top and a bottom, both said top and said bottom being provided with a peripheral groove receiving the upper and lower edges, respectively, of said side wall, said side wall having a plurality of circular openings of a size to admit a rat adjacent the bottom thereof, a bait cup centrally positioned in said receptacle, said bait cup having a bottom and an annular wall spaced a substantial distance from said annular side wall of said receptacle and extending upwardly to a height at least equal to the height of the top of said openings, a bolt passing centrally through said top and said bottom and through said cup, said bolt having a head engaging the outside wall of said bottom, a nut on said bolt clamping said cup against said bottom, a nut on the upper end of said bolt clamping said top against the upper edge of said side wall, and a water cup with an associated flange attached to said bait cup.

References Cited in the file of this patent

UNITED STATES PATENTS

| | | |
|---|---|---|
| 1,394,497 | Heller | Oct. 18, 1921 |
| 1,633,982 | Davis | June 28, 1927 |
| 1,700,517 | Ross | Jan. 29, 1929 |
| 2,664,663 | Mullen | Jan. 5, 1954 |

FOREIGN PATENTS

| | | |
|---|---|---|
| 648,419 | Germany | July 30, 1937 |